Patented Jan. 2, 1945

2,366,546

UNITED STATES PATENT OFFICE 2,366,546

METHOD OF DECOLORIZING AQUEOUS SOLUTION OF ALKALI METAL HYDROXIDES

William T. Nichols, near St. Albans, W. Va., assignor to Westvaco Chlorine Products Corporation, New York, N. Y., a corporation of Delaware No Drawing. Application May 14, 1942,
Serial No. 443,018

15 Claims. (Cl. 23—184)

This invention relates to a process for treating an aqueous solution of an alkali metal hydroxide, containing more than 20 per cent water, and produced from cell liquor made in diaphragm type chlorine-caustic cells, to remove the color normally present, which comprises; heating the solution at a temperature above 200° C. and a pressure above atmospheric for a predetermined period of time. Particularly, it is concerned with a process for removing the normal color from a concentrated solution of sodium hydroxide or potassium hydroxide containing more than twenty per cent water, and produced in diaphragm type chlorine-caustic cells, by heating the solution to a temperature above 200° C., and a superatmospheric pressure for a predetermined period of time, whereby the solution is rendered substantially colorless and color stable.

In present day commercial operation the dilute sodium or potassium hydroxide from diaphragm-type chlorine-caustic cells has a faint color. The origin of this color and the chemical nature of the material causing it is not understood, but it is believed to result from the electrolytic action in the cell and is intensified or developed during subsequent evaporation. The color is usually a faint yellow, but it varies in shade and intensity, depending upon conditions under which electrolysis is conducted and subsequent treatment to which the caustic is subjected. The color intensifies as the dilute cell liquor is evaporated, and at the ordinary commercial concentration of 50 and 70 per cent, this color is quite distinct. As evaporation proceeds, the color changes, but, ordinarily, 50 per cent sodium hydroxide has a blue tint and 70 per cent a pink color.

For lack of definite information on the nature of the coloring matter, I designate as "normal color" the color which develops upon evaporation of cell liquor from those cells wherein a permeable diaphragm is interposed between a graphite anode and a metal cathode. This normal color is ordinarily present in alkali metal hydroxides produced in such diaphragm type chlorine-caustic cells, and especially in concentrated solutions from such cells. Wherever the expression "normal color" is used herein, it is to be understood as applying to the color as above defined. To the best of my knowledge, the normal color characteristic of such alkali metal hydroxide solutions is not found in solutions produced by mercury cells or caustic alkalies made by the ammonia-soda process.

Commercial specifications relating to permissible color content in liquid caustic are becoming increasingly demanding so that it is desirable to reduce the color to as low a level as possible.

As noted above, commercial solutions are prepared from dilute cell liquor containing sodium or potassium hydroxide by concentration in vacuum evaporators to 50 or 70 per cent concentration by weight, and are either sold in this form or are withdrawn from the evaporators and are further evaporated in direct fired fusion pots to produce fused sodium or potassium hydroxide. This, on cooling, gives solid sodium hydroxide or potassium hydroxide. It has been observed that when the dehydration is completed in this manner and the finished anhydrous hydroxide while still in a molten condition has been subjected to the ordinary processes of sedimentation and clarification for removal of metallic impurities the solid product is free from coloring matter. The reason for this phenomenon has not been explained.

Considerable effort has been expended in devising methods for eliminating the color in aqueous solutions, but none of them has been completely successful. Much sodium and potassium hydroxide is sold as concentrated solutions, and it is important commercially to remove the color from these solutions.

The above-mentioned process of direct firing to cause substantially complete dehydration followed by the commonly employed steps of clarification and sedimentation results in a solid caustic which may be redissolved to give a color free solution. Such a process is not feasible commercially due to the high cost. Therefore, attempts to remove the color have been made by treating the solution of sodium or potassium hydroxide with oxidizing agents such as sodium hypochlorite and sodium or potassium peroxide, by electrolytic oxidation, or by exposing the aqueous solution to light waves. Combination of oxidation with light treatment has also been used. Some efforts have been made to absorb the color with various substances but such processes as these are expensive to operate, the color removal with them is often imperfect, and color stability poor.

A satisfactory process for removal of color from caustic must not only remove the color but the removal must permanent. With some processes, noted above, there is a reappearance of the color after treatment, especially on exposure to strong light, such as direct sunlight.

A solution of an alkali metal hydroxide that does not increase in color with time or upon exposure to light, is considered color stable. One of the principal disadavntages of older processes is that they do not yield a product which is completely color stable.

I have discovered that the color in alkali metal hydroxide solutions concentrated from cell liquor made in diaphragm type chlorine-caustic cells may be removed by heating the solution of alkali metal hydroxide to a temperature above about 200° C. and a pressure above atmospheric for a predetermined period of time, whereby the normal color of the caustic solution is either destroyed or permanently transformed into colorless material. The temperature to which the solution must be heated and the time of heating are interdependent. By this I mean that the higher the temperature which I use for treating the solution, the shorter the period of time I hold the solution at the treatment temperature. A temperature above about 200° C. is satisfactory, but the higher the temperature above this point the more rapid the color removal, and the better the color stability of the solution. The maximum temperature which may be utilized is limited mainly by the corrosion resistance of availabe commercial equipment, and the increased cost of conducting the process at high temperatures.

Because a solution may not be heated above its boiling point at atmospheric pressure, it is necessary, when heating sodium or potassium hydroxide solutions above 200° C., to conduct the process in a pressure vessel. For example, 50 per cent sodium hydroxide boils at approximately 142° C. and if it is desired to treat this solution at 300° C. a pressure of about 600 pounds per square inch is required. Seventy per cent sodium hydroxide boils at approximately 180° C. and a pressure of about 250 pounds per square inch is required at a temperature of 300° C. A similar relationship exists in the case of potassium hydroxide and the other alkali metal hydroxides. From these figures it is to be noted that the higher the concentration of alkali metal hydroxide in the solution to be treated the lower the pressure required for any given temperature. Pressures in excess of the minimum pressure required may be used, but this is not ordinarily advantageous or necessary.

I prefer to treat solutions of alkali metal hydroxides which have been concentrated above about 25 per cent hydroxide by weight so that the process may be conducted at a relatively low pressure, and, ordinarily, I treat solutions at the commercial concentrations of 50 and 70 per cent alkali metal hydroxide, since these products do not require additional evaporation and may be marketed directly after treatment.

My treatment results in a solution which is substantially color stable, i. e., one that does not increase in color upon exposure to light. The alkali metal hydroxide solution after treatment is low in color and is suitable for all uses where a color-free caustic is desired. On exposure to strong light, practically no increase in color is found, and this is a specific advantage of my process over older ones. This indicates that the treatment destroys the color forming materials, or transforms them into permanently colorless compounds.

It has been found that the upper limit of concentration of the solutions adaptable to treatment in accordance with the present invention is represented by those containing about 20 per cent water by weight and accordingly 80 per cent alkali metal hydroxide. The present invention is concerned with the removal of color from aqueous solutions which are liquid at temperatures below 150° C.

Due to the cost of heating a large mass of water, I prefer to treat concentrated solutions; preferably the ordinary commercial concentrations of 50 and 70 per cent. Also, it is advantageous to treat the more concentrated solutions because less pressure is required in order to reach the desired temperature.

In general, a temperature of 300° C. is advantageous and desirable for treatment since the reduction in color is rapid and substantially complete at this point, and solutions treated at that temperature are color stable.

The time of treatment depends upon the temperature of treatment. At 300° C. both 50 and 70 per cent sodium hydroxide are rendered substantially free of the normal color by treatment for one hour. As the temperature of treatment is lowered from 300° C. the pressure required is correspondingly reduced, but the time of treatment is increased. At approximately 200° C. the color removal is not complete even after four hours, but longer treatment would result in additional color removal. A temperature of 200° C. is the lower limit of commercial operability of my process. Below this temperature the color removal is so slow that the process is uneconomic.

It has further been found that the presence of a small amount of odixidizing agent during the heat treatment step results in an accelerating effect on the removal of color. Thus if sodium hypochlorite or sodium peroxide of the order of 1 gram per liter of solution is present during the heat treatment, the time of heating at 300° C., for example, may be lowered from 1 hour to 15 minutes. It is important to note that an adequate reduction in color, suitable for commercial requirements, can be effected as pointed out above, without utilization of an oxidizing agent which may accordingly be considered as optional.

The effect of oxidizing agent on the temperature and time of treatment is illustrated in the following table. (Table 1.)

TABLE 1

*50% sodium hydroxide heated at 200° C. for 60 minutes*

[Color distilled water=0]

| Oxidant | Color | Color stability (color after exposure) |
|---|---|---|
| Original—untreated | 50 | |
| None | 27 | 9 |
| 1.1 grams per liter Na$_2$O$_2$ | 6 | 9 |
| 1.0 gram per liter NaClO | 3 | 7 |

The color stability figures noted in the table are made by exposing the sample, after it has been treated by my process, for 15 minutes to light from a small mercury arc lamp, and then the color level is again measured in the standard way. If the sample is completely color stable, no change in the color level is observed when this treatment is made.

The function of the oxidizing agent, as observed from this table, is to reduce the time required at any given temperature to effect decolorization and impart color stability to the solution. The effect of time of treatment in conjunction with an oxidizing agent on the color stability is shown in Table 2.

TABLE 2

*50% sodium hydroxide heated at 300° C.*

[Color distilled water = 0]

| Oxidant NaClO | Time | Color | Color stability (color after exposure) |
|---|---|---|---|
| | Minutes | | |
| None | 15 | 1 | 5 |
| Do | 30 | 2 | 5 |
| Do | 60 | 2 | 3 |
| Do | 300 | 1 | 1 |
| 1.0 gram per liter | 15 | 2 | 2 |

It will be observed that the effect of adding one gram per liter of sodium hypochlorite and heating for only 15 minutes produces the same result as heating without an oxidizing agent for about 1 to 5 hours.

In selection of an oxidizing agent I prefer to use ones which are colorless in solution and which have colorless decomposition products. Otherwise, the oxidizing agent may add as much color to the solution as is removed by my treatment. Hydrogen peroxide, sodium and potassium peroxide and sodium hypochlorite are examples of satisfactory compounds. Other equivalent oxidizing agents will occur to those skilled in the art. The proportion of the oxidizing agent may be varied considerably from the figure given above, depending largely upon the relative activity of the agent employed. In short, the proportion given is merely illustrative and not critical.

One distinct advantage of my process is that it is adaptable to either a batch process or to continuous operation. The process is flexible and may be made suitable for any ordinary type of commercial conditions.

In a continuous process the feed caustic is pumped continuously to a heat exchanger in which the preferred temperature is reached by the caustic. The effluent, at the preferred temperature is passed through a pressure vessel where the caustic is maintained for a predetermined period of time at a temperature of 200° C. or higher. If required, heating facilities are provided to maintain the desired temperature. After the caustic has been in the retention vessel the predetermined time it is continuously withdrawn through a heat interchanger to give up its heat to the incoming material, and finally brought to atmospheric pressure through a reducing valve.

The following specific examples illustrate the invention:

*Example 1.*—The cell liquor from a diaphragm-type chlorine-caustic cell having a yellow tint and a concentration of approximately 10 per cent sodium hydroxide was further concentrated in a vacuum evaporator until the solution contained 50 per cent sodium hydroxide. The concentrated solution had a steel blue color represented on a comparative color basis as 50, as compared with distilled water as 0. The concentrated solution was heated for one hour at a temperature of 200° C. (pressure 107 lbs./sq. inch) in an autoclave. After this treatment the color on a comparative basis was 27 and there was no appreciable increase in color on prolonged storage and exposure to strong light.

*Example 2.*—A concentrated solution, identical with that treated in accordance with Example 1, was heated for one hour at 300° C. (pressure 600 lbs./sq. inch). The color of the resultant material was measured as 2 on the same comparative basis. The color stability of this sample after treatment was satisfactory and substantially no increase in color was observed on prolonged storage and on exposure to strong light.

*Example 3.*—A sample similar to the one used in Examples 1 and 2 was treated with a small amount of sodium hypochlorite equivalent to about one gram per liter of solution and then placed in an autoclave and heated to 300° C. for fifteen minutes. After this treatment the color on a comparative basis was approximately 2. Whereas in Example 2 one hour was required to reduce the color level from 50 to 2, only fifteen minutes was required when this oxidizing agent was used.

*Example 4.*—A sample of 70 per cent sodium hydroxide was heated to 300° C. for one hour in an autoclave. After this treatment the color was reduced to a low level, and after several weeks' exposure to light the color was unchanged, showing excellent stability.

While the foregoing illustrative examples relate specifically to the treatment of sodium hydroxide solutions substantially the same principles are to be observed where the solute comprises potassium hydroxide from the diaphragm type of chlorine caustic cell. The same remarks apply in general to the other alkali metal hydroxides.

Due to the high rate of corrosion of metal by hot caustic solutions, a number of different types of metal autoclaves or reactors were tried to find one which was least susceptible to corrosion. Any corrosion of the metal is undesirable since the corrosion products contaminate the caustic, and if the corrosion is bad enough, may even add to the color of the caustic. A silver-lined reactor has been found very suitable to prevent any trouble from contamination and also to avoid the difficulty of increase in color of the caustic due to corrosion products. The production of a silver-lined reactor is not difficult, and may be accomplished in any one of a number of different ways which are known to the art.

What I claim is:

1. The process for treating an aqueous solution of an alkali metal hydroxide produced from cell liquor made in diaphragm-type caustic-chlorine cells to remove the color which develops on concentration of the cell liquor which comprises heating the solution to a temperature above 200° C. and at a superatmospheric pressure which prevents further concentration of said solution during said heating for a period of time sufficient to render the solution substantially colorless and color stable and recovering the product from the heating zone as an aqueous solution.

2. The process of treating a relatively concentrated aqueous solution of an alkali metal hydroxide produced from cell liquor made in diaphragm-type caustic-chlorine cells to remove the color which developes on concentration of the cell liquor which comprises heating the solution to a temperature above 200° C. and at a superatmospheric pressure which prevents further concentration of said solution during said heating for a period of time sufficient to render the solution substantially colorless and color stable and recovering the product from the heating zone as an aqueous solution.

3. The process of treating an aqueous solution of sodium hydroxide produced from cell liquor made in an electrolytic cell of the type having a permeable diaphragm interposed between a metal cathode and graphite anode to remove the color which developes on concentration of the cell liquor which comprises heating the solution to a temperature above 200° C. and at a superatmospheric pressure which prevents further concentration of said solution during said heating for a period of time sufficient to render the solution substantially colorless and color stable and recovering the product from the heating zone as an aqueous solution.

4. The process of treating an aqueous solution of potassium hydroxide produced from cell liquor made in an electrolytic cell of the type having a permeable diaphragm interposed between a metal cathode and graphite anode to remove the color which developes on concentration of the cell liquor which comprises heating the solution to a temperature above 200° C. and at a superatmospheric pressure which prevents further concentration of said solution during said heating for a period of time sufficient to render the solution substantially colorless and color stable and recovering the product from the heating zone as an aqueous solution.

5. The process for treating an aqueous solution of an alkali metal hydroxide produced from cell liquor made in a diaphragm-type caustic-chlorine cell of the type having a permeable diaphragm interposed between a metal cathode and graphite anode and having a concentration within the range of 25 to 80 per cent alkali metal hydroxide to remove the color which developes on concentration of the cell liquor which comprises heating the solution to a temperature above 200° C. and at a superatmospheric pressure which prevents further concentration of said solution during said heating for a period of time sufficient to render the solution substantially colorless and color stable and removing the product from said heating zone as an aqueous solution.

6. The process for treating an aqueous solution of potassium hydroxide produced from cell liquor made in a diaphragm-type caustic-chlorine cell of the type having a permeable diaphragm interposed between a metal cathode and a graphite anode and having a concentration of potassium hydroxide within the range of 25 to 80 per cent to remove the color which developes on concentration of the cell liquor which comprises heating the solution to a temperature above 200° C. and at a superatmospheric pressure which prevents further concentration of said solution during said heating for a period of time sufficient to render the solution substantially colorless and color stable and removing the product from the heating zone as an aqueous solution containing more than 20 per cent water.

7. The process for treating an aqueous solution of sodium hydroxide produced from cell liquor made in a diaphragm-type caustic-chlorine cell of the type having a permeable diaphragm interposed between a metal cathode and a graphite anode and having a concentration of sodium hydroxide within the range of 25 to 80 per cent to remove the color which developes on concentration of the cell liquor which comprises heating the solution to a temperature substantially above 200° C. and at a superatmospheric pressure which prevents further concentration of said solution during said heating for a period of time sufficient to render the solution substantially colorless and color stable and removing the product from said heating zone as an aqueous solution containing at least 20 per cent of water.

8. A process as defined in claim 5 wherein an oxidizing agent is present in the solution during heating.

9. A process as defined in claim 6 wherein an oxidizing agent is present in the solution during heating.

10. A process as defined in claim 7 wherein an oxidizing agent is present in the solution during heating.

11. The process for treating an aqueous solution of an alkali metal hydroxide having a concentration of about 50 per cent made by evaporation of cell liquor from diaphragm-type caustic-chlorine cells of the type having a permeable diaphragm interposed between a metal cathode and a graphite anode to remove the color which developes on concentration of the cell liquor which comprises heating the solution at a temperature of about 300° C. and at a corresponding pressure which prevents further concentration of said solution for a period of time sufficient to render the solution substantially colorless and color stable and recovering the product from the heating zone as an aqueous solution.

12. The process for treating an aqueous solution of an alkali metal hydroxide having a concentration of about 70 per cent made by evaporation of cell liquor from diaphragm-type caustic-chlorine cells of the type having a permeable diaphragm interposed between a metal cathode and graphite anode to remove the color which developes on concentration of the cell liquor which comprises heating the solution at a temperature of about 300° C. and at a corresponding pressure which prevents further concentration of said solution for a period of time sufficient to render the solution substantially colorless and color stable and recovering the product from the heating zone as an aqueous solution.

13. A process for producing an aqueous solution of sodium hydroxide that is color stable and substantially free of the color which develops upon concentration of cell liquor from diaphragm type caustic-chlorine cells, which comprises evaporating cell liquor containing sodium hydroxide from an electrolytic cell having a permeable diaphragm interposed between a metal cathode and graphite anode, to a concentration of about 50 per cent and heating the 50 per cent solution to a temperature of about 300° C. and at a pressure of about 600 pounds per square inch which prevents further concentration of said solution during said heating for a period of time sufficient to render the solution substantially colorless and color stable and removing the solution from the heating zone as an aqueous solution of substantially the same concentration introduced.

14. A process for producing an aqueous solution of sodium hydroxide that is color stable and substantially free of the color which develops upon concentration of cell liquor from diaphragm type caustic-chlorine cells, which comprises evaporating cell liquor containing sodium hydroxide from an electrolytic cell having a permeable diaphragm interposed between a metal cathode and graphite anode to a concentration of about 70 per cent and heating the 70 per cent solution to a temperature of about 300° C. and at a pressure of about 250 pounds per square inch which prevents further concentration of said solution during said heating for a period of time sufficient to render the solution substantially colorless and color stable and removing the solution from the heating zone as an aqueous solution of substantially the same concentration introduced.

15. The process of treating a concentrated aqueous solution of an alkali metal hydroxide produced from cell liquor made in diaphragm type caustic-chlorine cells, to remove the color which develops upon concentration of the cell liquor, which comprises heating said solution containing more than 20 per cent water, to a temperature above 200° C. at a corresponding superatmospheric pressure which prevents further concentration of said solution for a sufficient time to render the solution substantially colorless and color stable and removing the product from the heating zone as an aqueous solution, and containing at least 20 per cent of water.

WILLIAM T. NICHOLS.